(12) United States Patent  
Watanabe et al.

(10) Patent No.: US 7,198,831 B2  
(45) Date of Patent: Apr. 3, 2007

(54) MULTI-LAYER SHEET AND LIQUID CRYSTAL DISPLAY DEVICE

(75) Inventors: Noriko Watanabe, Osaka (JP); Takashi Sato, Osaka (JP); Yukihiro Sumida, Osaka (JP); Junichi Shimaoka, Hasuda (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/039,837

(22) Filed: Jan. 24, 2005

(65) Prior Publication Data

US 2005/0122455 A1 Jun. 9, 2005

Related U.S. Application Data

(63) Continuation of application No. 10/121,681, filed on Apr. 15, 2002, now abandoned.

(30) Foreign Application Priority Data

Apr. 16, 2001 (JP) ............................. 2001-117339

(51) Int. Cl.
*G02F 1/3333* (2006.01)

(52) U.S. Cl. .................. 428/1.5; 428/1.1; 428/1.3; 349/95; 349/112; 349/122; 430/914; 525/918

(58) Field of Classification Search ............. 428/1.3, 428/1.5, 1.31, 1.53–1.54, 1.1; 430/914, 163; 522/15, 25, 31–32; 525/918; 349/95–96, 349/112, 122
See application file for complete search history.

(56) References Cited

U.S. PATENT DOCUMENTS

| | | | | |
|---|---|---|---|---|
| 4,414,275 A | * | 11/1983 | Woods | ................ 428/352 |
| 5,286,408 A | * | 2/1994 | Naemura et al. | ...... 252/299.01 |
| 5,555,476 A | * | 9/1996 | Suzuki et al. | ................ 349/95 |
| 5,600,456 A | * | 2/1997 | Maruyama et al. | ........... 349/64 |
| 5,714,218 A | * | 2/1998 | Nishio et al. | ............. 428/64.1 |
| 5,721,289 A | * | 2/1998 | Karim et al. | ................ 522/31 |
| 5,745,199 A | * | 4/1998 | Suzuki et al. | ................ 349/95 |
| 5,851,664 A | * | 12/1998 | Bennett et al. | ........ 428/355 BL |
| 6,078,371 A | * | 6/2000 | Ichikawa et al. | ............. 349/95 |
| 6,137,555 A | * | 10/2000 | Tamura et al. | ................ 349/95 |
| 6,147,732 A | * | 11/2000 | Aoyama et al. | ............ 349/112 |
| 6,307,675 B1 | * | 10/2001 | Abe et al. | ................ 359/457 |
| 6,440,880 B2 | * | 8/2002 | Mazurek et al. | ............ 442/151 |
| 6,582,789 B1 | * | 6/2003 | Sumi | ................ 428/40.1 |
| 6,592,802 B1 | * | 7/2003 | Goto et al. | ................ 264/496 |
| 6,784,962 B2 | * | 8/2004 | Sumida et al. | ............. 349/122 |
| 2002/0113925 A1 | * | 8/2002 | Higashi | ................ 349/113 |

FOREIGN PATENT DOCUMENTS

JP 5-249453 A 9/1993

(Continued)

*Primary Examiner*—Rena Dye  
*Assistant Examiner*—Sow-Fun Hon  
(74) *Attorney, Agent, or Firm*—Kubovcik & Kubovcik (57) ABSTRACT

The curable pressure-sensitive adhesive sheet A of this invention comprises an optically transparent substrate on which the curable pressure-sensitive adhesive layer 2 is layered on and integrated therewith. The curable pressure-sensitive adhesive layer 2 comprises a curable pressure-sensitive adhesive composite comprising a cationically-polymerizable compound, a polymer and a photocationic polymerization initiator. Surface roughness $R_t$ of a surface of the curable pressure-sensitive adhesive layer is 2 μm or less.

4 Claims, 4 Drawing Sheets

FOREIGN PATENT DOCUMENTS

| | | |
|---|---|---|
| JP | 7-43703 A | 2/1995 |
| JP | 7-120743 A | 5/1995 |
| JP | 9-127309 A | 5/1997 |
| JP | 9-194799 A | 7/1997 |
| JP | 11-166159 A | 6/1999 |
| JP | 2000-47332 A | 2/2000 |
| JP | 2000-187283 A | 7/2000 |
| JP | 2000-246855 A | 9/2000 |
| JP | 2001-72938 A | 3/2001 |
| JP | 2001-247834 A | 9/2001 |
| JP | 2002-96395 A | 4/2002 |

\* cited by examiner

MULTI-LAYER SHEET AND LIQUID CRYSTAL DISPLAY DEVICE

This application is a continuation of U.S. patent application Ser. No. 10/121,681, filed Apr. 15, 2002, now abandoned. This application claims priority of Japanese Patent Application No. 2001-117339, filed Apr. 16, 2001, which is incorporated herein by reference.

FIELD OF INVENTION

This invention relates to a curable pressure-sensitive adhesive sheet, a multi-layer sheet utilizing the curable pressure-sensitive adhesive sheet and a liquid crystal display device utilizing the multi-layer sheet, which liquid crystal display device do not have irregularity in display performance, and in which viewing angle dependence is improved.

PRIOR ART

Liquid crystal display devices having such advantages as lightweight, thinness and low consumption of electric power are widely used today as display devices for office automation equipments, televisions, car navigations, video cameras and so forth.

In general, a liquid crystal display device displays images by changing alignment of liquid crystal molecule by impressing voltage on the liquid crystal arranged between a pair of glass substrates. A TN (twisted nematic) liquid crystal display device, which is used most widely today, is constructed in a way that when voltage is not impressed on the liquid crystal, namely, when average array of the liquid crystal molecules is in parallel to the glass substrate, the liquid crystal display device shows bright state (white), and when enough voltage is impressed on the liquid crystal, namely, when the liquid crystal molecules are in almost perpendicular to the glass substrate, the liquid crystal display device shows dark state (black). Further, the TN liquid crystal display is so constructed that when moderate voltage is impressed, the liquid crystal molecules are arrayed at a predetermined angle to the glass substrate to show moderate gray scale.

However, when the liquid crystal display surface is observed from angles deviating from the right front of the liquid crystal display, the liquid crystal molecules appear differently from when the liquid crystal display surface is observed from the right front thereof. Consequently, such phenomenon is observed in which a part displayed in black appears whitish (deterioration of contrast) or the brightness and darkness appear to be reversed (reverse in gray scale), wherefore there arises a problem that displayed image can not be read precisely. Thus, the above-mentioned liquid crystal display device has a problem that displayed image varies depending of viewing angles, namely, there is much viewing angle dependence.

Various methods have been suggested in order to solve the above-mentioned problem. In a publication of a Japanese Patent Laid-Open Publication Number 5-249453, a method is disclosed in which a lens sheet is arranged on the viewer's side of liquid crystal cell. To be specific, viewing angle dependence is improved by diffusing the light coming through the lens sheet where multiple number of convex lenses are aligned on the viewer's side of the liquid crystal display element.

However, it is necessary to fix the lens sheet and the liquid crystal display element to each other in order to make a liquid crystal display device in which viewing angle dependence is improved by using the lens sheet. A lens surface can not keep tightly adhering to the glass substrate only by arranging the lens sheet on the viewer's side of the liquid crystal display element because of the warp of the lens sheet and the glass substrate of the liquid crystal display element, which caused problems like enhancement in aberration of view and blur of display.

Further, in a publication of Japanese Patent Laid-Open Publication No. 7-43703, a method for fitting a micro lens array sheet is disclosed in which the micro lens array sheet filled with a filling material having a predetermined refractive index is fit between the micro lens array sheet and the liquid crystal cell facing to each other.

However, as refractive index of the filling material applicable to the above-mentioned method is presently limited to the range of 1.4~1.6, it is impossible to secure enough difference in refractive index between the micro lens array sheet and the filling material. Therefore, there was a problem that enough effect of improvement in viewing angle dependence could not be attained.

Further, in Japanese Patent Laid-Open Publication Numbers 7-120743 and 9-127309, a liquid crystal display device is disclosed in which a pressure-sensitive adhesive layer is provided on a predetermined part of area of the lens surface of the micro lens array sheet, and in the remaining part, the lens surface and a layer of the air are in contact with each other. In the area where the lens surface and the layer of the air are in contact, enough difference in refractive index can be secured, the effect of light-diffusing is high and the effect of improvement in viewing angle dependence can be attained.

However, the above-mentioned liquid crystal display device has the following problem. Namely, a light-diffusing sheet represented by a micro lens array sheet is usually arranged over a polarizer of the viewer's side of the liquid crystal display element in a state that the lens surface faces the polarizer. This is because such unfavorable matters occur like deterioration in contrast and undesired coloring, if light-diffusing sheet is arranged between the polarizer and the liquid crystal display element when the light-diffusing sheet itself has a birefringence, and if the lens surface is arranged to face the viewer, incoming beam of light from the outside diffuses and reflects, consequent of which is that the display image of the liquid crystal display becomes hard to be viewed.

It is true that the above-mentioned problem can be solved by adhering the micro lens array sheet and the polarizer together in a state that a part of an area of the lens surface of the micro lens array sheet and the pressure-sensitive adhesive layer provided on the polarizer comes into contact with each other, as described in the publication of Japanese Patent Laid-Open Publication Numbers 7-120743 and 9-127309. However, a new problem of irregularity in display performance was found.

The above-mentioned irregularity in display performance occurs irrespective of the type of the polarizer, and the display image quality of the liquid crystal display device is considerably lowered. Therefore, a cause of the irregularity in display performance was investigated, and as a result, it was found that the area, where the lens surface of the micro lens array sheet and the pressure-sensitive adhesive layer were in contact with each other, varied depending on the location, which was reflected by optical quality, and was viewed as irregularity in display performance. Details of the irregularity in display performance are described below.

In general, since the liquid crystal display element carries out displaying by controlling the polarizing condition, each of a pair of polarizers is arranged on the rear and front surface thereof. The polarizer can be obtained by drawing a synthetic resin, after being impregnated with iodine, in a predetermined direction to array the iodine in the same direction. Polarizing can be obtained in a way that when the light comes into the polarizer, only the light that vibrates in the direction of the drawing of the synthetic resin is absorbed.

However, the above-mentioned polarizer has slight unevenness in thickness in a direction perpendicular to the direction of the drawing attributed to the drawing process described above. The unevenness in thickness causes minute wavy undulation on the surface of the polarizer.

The wavy undulation is so minute as a few μm of difference in thickness between adjacent concave and convex. Accordingly, the wavy undulation rarely influences the quality of display image in an ordinary liquid crystal display device in which a polarizer is arranged at the most outer side, and in a liquid crystal display device on which a flat touch panel is layered via a layer of the air, and so forth.

Figure 8:
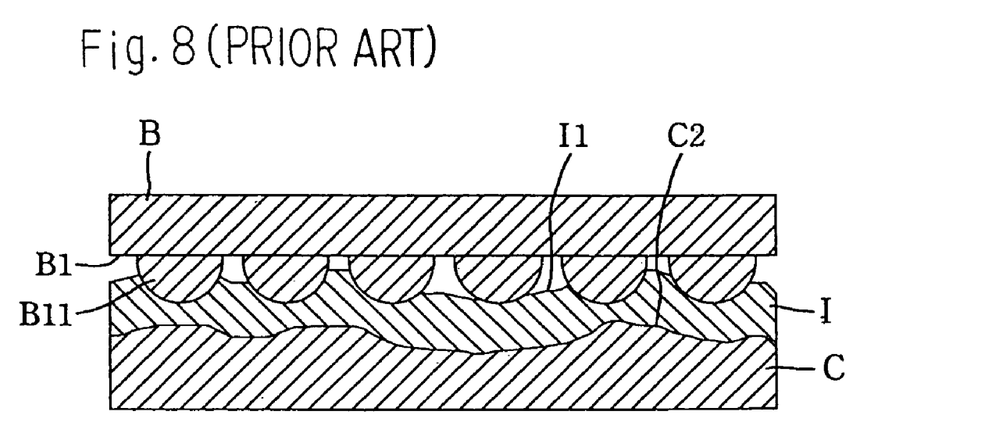
FIG. 8 shows a vertical sectional view showing a state of layers of the light-diffusing sheet onto a conventional polarizer.

However, in an adhesion structure as mentioned above, in which a part of a lens element B11 of the lens surface (surface of concave and convex) B1 of the light-diffusing sheet B and the pressure-sensitive adhesive layer I are in contact, as shown in FIG. 8, at the time when the pressure-sensitive adhesive I is formed on the polarizer C with the wavy undulation C2, undulation I1 already occurs over the surface of the pressure-sensitive adhesive layer I, which is attributed to the undulation C2 of the polarizer C. Consequently, when the lens surface (surface of concave and convex) B1 of the light-diffusing sheet B is pressingly placed onto the pressure-sensitive adhesive layer I, the lens surface (surface of concave and convex) B1 of the light-diffusing sheet B can not completely follow up the undulation C2 of the polarizer C, wherefore there was a problem that the area of contact between the lens element B11 of the lens surface (surface of concave and convex) B1 of the light-diffusing sheet B and the pressure-sensitive adhesive layer I varied depending on the locations.

The variation in the area of contact between the lens elements B11 of the lens surface (surface of concave and convex) B1 of the light-diffusing sheet B and the pressure-sensitive adhesive layer I is reflected as it is on the optical quality, which causes irregularity in display performance. And it was found that when the variation in the area of contact was around 10%, it was recognized as clear irregularity in display performance.

SUMMARY OF THE INVENTION

This invention is to provide the curable pressure-sensitive adhesive sheet which can adhere to the light-diffusing sheet without causing deviation of optical quality, a first multi-layer sheet, having no deviation of optical quality, which is constructed in a way that a light-diffusing sheet is layered on and integrated with the optically transparent substrate via a curable pressure-sensitive adhesive layer of the curable pressure-sensitive adhesive sheet, a second multi-layer sheet having no deviation of optical quality which is constructed in a way that the polarizer is layered on and integrated with the other side of the optically transparent substrate of the first multi-layer sheet via a pressure-sensitive adhesivelayer, and a liquid crystal display device utilizing the second multi-layer sheet which does not have irregularity in display performance and in which viewing angle dependence is improved.

Figure 1:
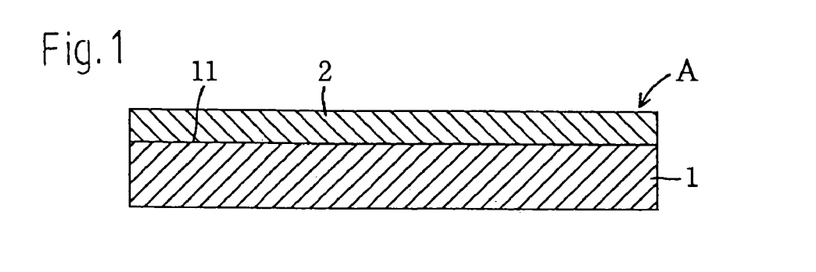
FIG. 1. shows a vertical sectional view of the curable curable pressure-sensitive adhesive sheet according to this invention.

As shown in FIG. 1, a curable pressure-sensitive adhesive sheet A according to this invention is the curable pressure-sensitive adhesive sheet, in which a curable pressure-sensitive adhesive layer 2 is layered on and integrated with the whole surface of an optically transparent substrate 1, and the said curable pressure-sensitive adhesive layer 2 comprises the curable pressure-sensitive adhesive composite which comprises a cationically-polymerizable compound, a polymer and a photocationic polymerization initiator, and that a surface roughness $R_t$ of the surface of the curable pressure-sensitive adhesive layer 2 is 2 μm or less.

The substrate 1 comprising the above-mentioned curable pressure-sensitive adhesive sheet is not particularly specified as far as the same is optically transparent. For example, polyethylene terephthalate film, glass, etc. may be adopted, among which polyethylene terephthalate film is preferable because the same can easily be layered on and integrated with the curable pressure-sensitive adhesive layer 2.

When the surface roughness $R_t$ of a face 11 of the above-mentioned substrate 1 is large, over which face the curable pressure-sensitive adhesive layer 2 is layered, the surface roughness $R_t$ of the surface of the curable pressure-sensitive adhesive layer 2, which is layered on and integrated with the substrate 1, also becomes large. Consequently, the area of contact between the curable pressure-sensitive adhesive layer 2 and the lens surface (surface of concave and convex) of a light-diffusing sheet B, which is layered on and integrated with the curable pressure-sensitive adhesive layer 2, varies depending on the locations, and causes irregularity in display performance on the liquid crystal display device. Accordingly, the surface roughness $R_t$ should preferably be 2 μm or less.

In this specification, the above-mentioned surface roughness $R_t$ means a height from the bottom of the lowest valley to the top of the highest mountain of the uneven surface on the curable pressure-sensitive adhesive layer 2 or the substrate 1 within an evaluation length. To be more specific, the height from the bottom of the lowest valley to the top of the highest mountain of the uneven surface within the evaluation length is measured with a surface profiler (manufactured by Taylor Hobson Corp., trade name "Form Talysurf Series 2"). The uneven surface is formed on the curable pressure-sensitive adhesive layer 2 or the surface of the substrate 1.

Further, the curable pressure-sensitive adhesive layer 2 is layered on and integrated with the face 11 of the above-mentioned substrate 1. The curable pressure-sensitive adhesive layer 2 comprises the curable pressure-sensitive adhesive composite comprising a cationically-polymerizable compound, a polymer and a photocationic polymerization initiator.

In addition, the above-mentioned curable pressure-sensitive adhesive layer 2 is so adjusted that the surface roughness $R_t$ of the surface thereof can be 2 μm or less. The background is as follows. Namely, as will be mentioned later, the light-diffusing sheet B is layered on and integrated with the curable pressure-sensitive adhesive layer 2 in a state that a part (tip) of the lens element B11 of the lens surface B1 is embedded in the curable pressure-sensitive adhesive layer 2. Therefore, if the surface roughness $R_t$ of the curable pressure-sensitive adhesive layer 2 exceeds 2 μm, the area of contact between the lens elements B11 of the lens surface B1 of the light-diffusing sheet B and the curable pressure-sensitive adhesive layer 2 substantially varies depending on the location of the lens element B11 of the lens surface B1, and the variation causes irregularity in display performance.

The above-mentioned cationically-polymerizable compounds can harden the curable pressure-sensitive adhesive layer 2 by heightening molecular weight by cationic polymerization. For example, such cationically-polymerizable compounds may be suggested that contains functional group with photocationic polymerization function like epoxy group, alicyclic epoxy group, vinyl ether group, hydroxyl group, ethyleneimino group, or episulfide group in the molecule. However, from the standpoint of high polymerization performance, an epoxy based compounds having epoxy group or alicyclic epoxy group in the molecule, and vinyl ether based compounds having vinyl ether group in the molecule thereof are preferable. Further, from the standpoint of high storage modulus at 23° C. by dynamic viscoelasticity spectrum after hardening, stronger adhesion force and better heat-resisting performance, the epoxy based compounds having epoxy group or alicyclic epoxy group in the molecule is preferable. In the meantime, the above-mentioned cationically-polymerizable compounds may be used independently or jointly.

As the above-mentioned epoxy based compounds having epoxy group in the molecule, such various kinds of epoxy resin may be suggested that are more than two functional groups like phenol novolac type epoxy resin, cresol novolac type epoxy resin, glycidyl ether type epoxy resin, glycidyl amine type epoxy resin and a bisphenol type epoxy resin comprising a bisphenol A type epoxy resin and bisphenol F type epoxy resin, etc., for example.

As the above-mentioned epoxy based compounds having alicyclic epoxy group in the molecule thereof, 3,4-epoxycyclohexylmethyl-3,4-epoxycyclohexanecarboxylate, 3,4-epoxy-2-methylcyclohexylmethyl-3,4-epoxy-2-methylcyclohexanecarboxylate, bis(3,4-epoxycyclohexyl)adipate, bis(3,4-epoxycyclohexylmethyl)adipate, bis(3,4-epoxy-6-methylcyclohexylmethyl) adipate, 2-(3,4-epoxycyclohexyl-5,5-spiro-3,4-epoxy) cyclohexanone-meta-dioxane and bis(2,3-epoxycyclopentyl)ether, are suggested for example.

In case a content of the cationically-polymerizable compound in the curable pressure-sensitive adhesive composite is high, it may happen that the adhesion force at an initial stage deteriorates, and the storage modulus by dynamic viscoelasticity spectrum at 23° C. after hardening of the curable pressure-sensitive adhesive becomes too high and impact strength declines wherefore become fragile at a low temperature. In case the content of the cationically-polymerizable compound in the curable pressure-sensitive adhesive composite is low, a cohesion force of the curable pressure-sensitive adhesive does not rise enough, wherefore enough adhesion force and heat-resisting property cannot be obtained. Accordingly, the content of the cationically-polymerizable compound in the curable pressure-sensitive adhesive composite should preferably be 10~50% in weight.

A functional group equivalent of the above-mentioned cationically-polymerizable compound is not particularly specified. However, in case the functional group equivalent is large, reactivity of the curable pressure-sensitive adhesive composite declines and photocationic polymerization may not proceed enough or hardening may slow down. In case the functional group equivalent is small, reactivity of the curable pressure-sensitive adhesive composite rises and hardening by application of the light may proceed too fast and the following operational process may be hindered. Consequently, the functional group equivalent should preferably be 150~5000 g-resin/mol.

Furthermore, the polymer is not particularly limited as far as the polymer has moderate polarity and has high adhesiveness, and also has a compatibility with respect to the cationically-polymerizable compound and the photocationic polymerization initiator. For example, polyester based polymers, polyurethane based polymers, acryl based polymers, polyether based polymers, polyamide based polymers, silicone based polymers, polyolefin based polymers, polyimide based polymers, polystylene based polymers like stylene-butadiene-stylene block copolymer, etc; vinyl based polymers like polyvinylacetate, copolymer of vinylchloride and vinylacetate, poly-N-vinylpyrolidone etc.; and natural polymers like cellulose based polymers, protein based polymers, starch based polymers, etc. are suggested. From the standpoint that enough film strength can be provided even if the molecular weight is low because of high cohesion force, and that operational performance is high when the curable pressure-sensitive adhesive layer 2 is layered on and integrated with the substrate 1, polyester based polymers, polyurethane based polymers, acryl based polymers, polyether based polymers and polystyrene based polymers are preferable, among which polyester based polymers, polyurethane based polymers and polystyrene based polymers are more preferable. Further, polyethter based polymers and polystyrene based polymers are especially preferable. The polymers may be used independently or jointly.

In case the content of the polymer in the curable pressure-sensitive adhesive composite is high, it may happen that the cohesion force of the curable pressure-sensitive adhesive does not rise enough, consequent of which is that enough adhesion force and heat-resisting property cannot be obtained. In case the content of the same is low, it may happen that the adhesion force at the initial stage deteriorates, and the storage modulus by dynamic viscoelasticity spectrum at 23° C. after hardening of the curable pressure-sensitive adhesive becomes too high and the impact strength declines, wherefore become fragile at a low temperature. Accordingly, the content of the polymer in the curable pressure-sensitive adhesive composite should preferably be 50~90% in weight.

As the above-mentioned photocationic polymerization initiator, it is adoptable if phtotocationic polymerization initiating material is generated by being activated by application of the light and if the cationically-polymerizable compound can be photocationic polymerized with a comparatively low energy. Accordingly, ionic photo-acid generating type photocationic polymerization initiators, or nonionic photo-acid generating type photocationic polymerization initiators may be adoptable.

As the above-mentioned ionic photo-acid generating type photocationic polymerization initiators, for example, aromatic sulfonium salt such as aryldiazonium salt, diarylhalonium salt, triarylsulfonium salt, etc; onium salt such as triphenylphosphonium salt etc; and organometalic compounds such as Fe-arene complex, titanocene complex, and arylsilanol-aluminum complex, etc. are suggested.

As the nonionic photo-acid generating type photocationic polymerization initiators, for example, nitrobenzylester, sulfonic acid derivative, phosphoric acid ester, phenol sulfonic acid ester, diazonaphthoquinone, N-hydroxyimidesulfonate, etc., are suggested.

Quantity of loadings of the above-mentioned photocationic polymerization initiator is not particularly limited, as far as the same is appropriately determined according to the reactivity and molecular weight of the cationically-polymerizable compound or viscoelasticity supposed to be given to the curable pressure-sensitive adhesive layer 2. However, if the quantity is large, the reactivity of the curable pressure-sensitive adhesive composite becomes large and hardening by application of the light may proceed too fast and the following operational process may be hindered. If the quantity is small, hardening of the curable pressure-sensitive adhesive composite may not proceed enough or may slow down. Accordingly, 0.001~10 mol % per mol of the functional group of the cationically-polymerizable compound is preferable.

In the meantime, as far as properties of the curable pressure-sensitive adhesive composite are not ruined, such tackifier as rosin ester resin may appropriately be added to the above-mentioned curable pressure-sensitive adhesive composite in addition to the cationically-polymerizable compound, the polymer and the photocationic polymerization initiator.

Further, infrared rays, visible rays, ultraviolet rays, X-rays, $\alpha$-rays, $\beta$-rays, $\gamma$-rays, electron beams and so on are suggested for example, as the light to activate the above-mentioned cationic polymerization initiator, among which the ultraviolet rays or rays having longer waves than ultraviolet rays are preferable in terms of advantages in safety and cost, and the ultraviolet rays with wavelength of 200~400 nm are more preferable as the same are easy to handle and have high energy.

In the meantime, a high-pressure mercury lamp, an ultra-high-pressure mercury lamp, a metal halide lamp, a chemical lamp, a xenon lamp and so on are suggested for example, as a source of the ultraviolet rays. The light may be emitted with an electrode unit or electrodeless unit by using the source.

In the curable pressure-sensitive adhesive composite comprising the above-mentioned curable pressure-sensitive adhesive layer 2, the storage modulus by dynamic viscoelasticity spectrum at 23° C. before hardening should preferably be $9.0 \times 10^5$ Pa or less, and more preferably be $1.0 \times 10^4 \sim 9.0 \times 10^5$ Pa.

The preferable storage modulus as above-mentioned is because if the storage modulus by dynamic viscoelasticity spectrum at 23° C. is large, enough flexibility can not be obtained at a normal temperature, and pressure-sensitive adhesive force, adhesion property to what is adhered, and property of following-up to the undulations of what is adhered may decline. In addition, if the storage modulus is large, in case the light-diffusing sheet B is layered on the curable pressure-sensitive adhesive layer 2, the lens element B11 of the lens surface B1 in the light-diffusing sheet B is not embedded enough into the curable pressure-sensitive adhesive layer 2 and enough display property may not be obtained. If the storage modulus is small, fluidity at a normal temperature becomes too high and bulging-out and pollution to surroundings may occur.

Further, in the curable adhesive composite comprising the above-mentioned curable pressure-sensitive adhesive layer 2, the storage modulus by dynamic viscoelasticity spectrum at 23° C. after hardening should preferably be $4.0 \times 10^6$ Pa or more, and more preferably be $4.0 \times 10^6 \sim 1.0 \times 10^{10}$ Pa.

The preferable storage modulus as above-mentioned is because if the above-mentioned storage modulus at 23° C. by dynamic viscoelasticity spectrum is small, the cohesion force does not rise enough, shearing adhesive force may become insufficient, a follow-up property to transformation may become too large, and consequently, the curable pressure-sensitive adhesive layer 2 is transformed when being adhered to the polarizer, a relative position between the curable pressure-sensitive adhesive layer 2 and the light-diffusing sheet B layered thereover changes, wherefor the area of contact with each other becomes uneven, and consequently, deviation of optical quality in the liquid crystal display device and irregularity in display performance may occur. If the above-mentioned storage modulus at 23° C. by dynamic viscoelasticity spectrum is large, the cured pressure-sensitive adhesive layer, which is obtained by hardening the curable pressure-sensitive adhesive composite, becomes too hard, and the impact strength, the follow-up property to transformation and cold-resistance may be deteriorated.

Figure 2:
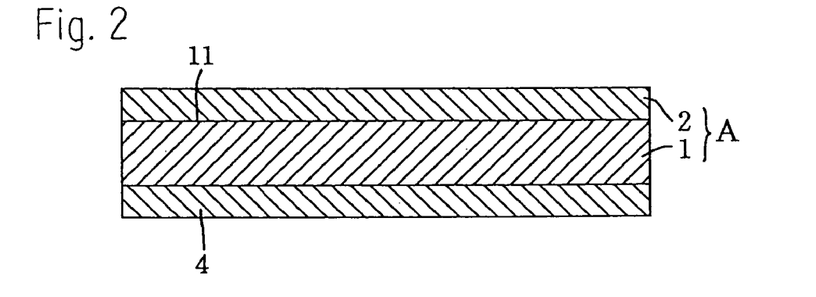
FIG. 2 shows a vertical sectional view of another example of the curable curable pressure-sensitive adhesive sheet.

Furthermore, as shown in FIG. 2, the pressure-sensitive adhesive layer or an adhesive layer 4 may be layered on and integrated with another side of the above-mentioned substrate 1 for adhesion with the polarizer C. As the pressure-sensitive adhesive or the adhesive comprising the pressure-sensitive adhesive layer or the adhesive layer 4, acryl, silicone, and urethane based pressure-sensitive adhesive or adhesives are suggested. Among the suggested pressure-sensitive adhesive or the adhesive, acryl based pressure-sensitive adhesive is preferable in view of adhesive force, heat resistance, and damp and heat resistance. What is more preferable is acryl based pressure-sensitive adhesive comprising acryl based polymer loaded with one or more kinds of crosslinking agents selected from a group of an organic compound, an organometallic compound and a metallic salt, each having multifunctional group. The said acryl based polymer has alkyl (meth)acrylate with alkyl group of carbon number of 4~12 as a chief component and copolymerized with monomer having crosslinking functional group which reacts to the afore-mentioned multifunctional group of the crosslinking agent.

Weight-average molecular weight (Mw) of the above-mentioned acryl based pressure-sensitive adhesive should preferably be 800,000 or more, because if the weight-average molecular weight is small, heat resistance declines and cohesion at a high temperature lowers, consequent of which is that foaming and peeling or exfoliation may occur in use environment after being mounted on the liquid crystal display.

A ratio (Mw/Mn) of the weight-average molecular weight (Mw) to number-average molecular weight (Mn) of the above-mentioned acryl based pressure-sensitive adhesive should preferably be 4.0 or less, because if the ratio is high, heat resistance declines and cohesion at a high temperature lowers, consequent of which is that foaming or exfoliation may occur.

Figure 3:
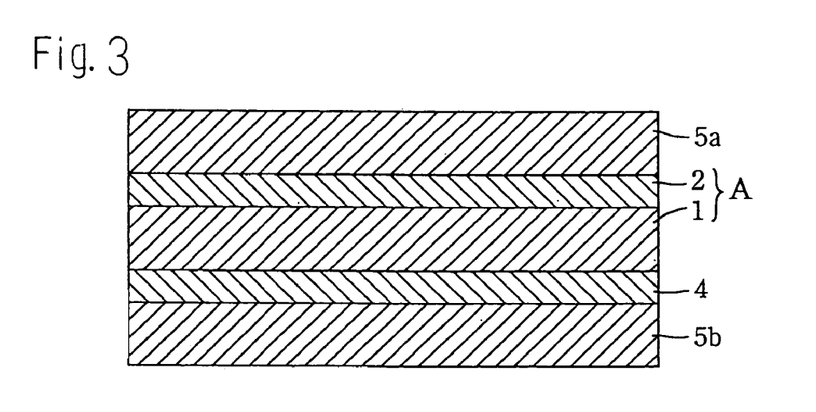
FIG. 3 shows a vertical sectional view showing a state in which a release sheets are layered on both sides of the curable curable pressure-sensitive adhesive sheet of FIG. 2.

And, as shown in FIG. 3, release sheets 5a, 5b composed of polyethylene terephthalate and the like may be separably layered on the curable pressure-sensitive adhesive layer 2 and the pressure-sensitive adhesive layer (adhesive layer) 4 of the above-mentioned curable curable pressure-sensitive adhesive sheet A until use, in order to avoid transformation by external force which may be applied to the curable pressure-sensitive adhesive layer 2 and the pressure-sensitive adhesive layer (adhesive layer) 4 and to prevent alien substances from entering.

Now, manufacturing process of the above-mentioned curable curable pressure-sensitive adhesive sheet A is described hereinafter. The manufacturing process of the above-mentioned curable curable pressure-sensitive adhesive sheet A is not particularly specified. However, for example, the following processes for manufacturing the curable pressure-sensitive adhesive sheet A are suggested: ① A polyethylene terephthalate film having a silicone coated surface with the surface roughness of 2 μm or less is coated with the above-mentioned curable pressure-sensitive adhesive composite in a predetermined thickness by using an ordinary roll coater. Then the polyethylene terephthalate film is stuck onto the above-mentioned substrate 1, whose surface roughness $R_t$ is preferably 2 μm or less, by using a laminator in a state that the curable pressure-sensitive adhesive composite layer comes inside. Then the curable pressure-sensitive adhesive composite layer on the polyethylene terephthalate film is transferred onto the above-mentioned substrate 1. ② The substrate 1, whose surface roughness $R_t$ is 2 μm or less, is coated with the curable pressure-sensitive adhesive composite in a predetermined thickness by using the ordinary roll coater.

When the pressure-sensitive adhesive layer or the adhesive layer 4 is layered on and integrated with the other surface of the substrate 1 of the curable curable pressure-sensitive adhesive sheet A, the other side of the substrate 1 may be coated with the pressure-sensitive adhesive or the adhesive by using the ordinary roll coater.

Following is a description of points of use of the curable curable pressure-sensitive adhesive sheet A. The curable curable pressure-sensitive adhesive sheet A is used in a way that the light-diffusing sheet B is layered on and integrated with the curable pressure-sensitive adhesive layer 2. The light-diffusing sheet B is not particularly specified as long as the same is what has been used generally and conventionally. However, the micro lens array sheet, in which micro unit lenses are two-dimensionally arrayed within the surface, a lenticular lens sheet in which furrow-shaped lenses of nearly semicircle are arrayed, prism sheet and the like are suggested, for example. The micro lens array sheet diffuses the light in every direction, and the lenticular lens sheet and the prism sheet diffuse the light in two directions which are vertical to the furrow of the lenses. Accordingly, the lens sheet may be appropriately selected taking compatibility of the liquid crystal display device with the optical quality into consideration.

First of all, in case the release sheet 5a is layered on the curable pressure-sensitive adhesive layer 2 of the curable pressure-sensitive adhesive sheet A, the release sheet 5a is exfoliated to expose the curable pressure-sensitive adhesive layer 2, and the light is applied to the curable pressure-sensitive adhesive layer 2 in order to photocationically polymerize the cationically polymerizable compound of the curable adhesive composite comprising the curable pressure-sensitive adhesive layer 2. Even at this stage, the curable pressure-sensitive adhesive layer 2 is not completely hardened wherefore maintains enough flexibility.

The light may be applied to the curable pressure-sensitive adhesive composite through the release sheet 5a without exfoliating the release sheet 5a from the curable pressure-sensitive adhesive layer 2, however, it is required to increase the application of the light as the release sheet 5a absorbs the light.

Figure 4:
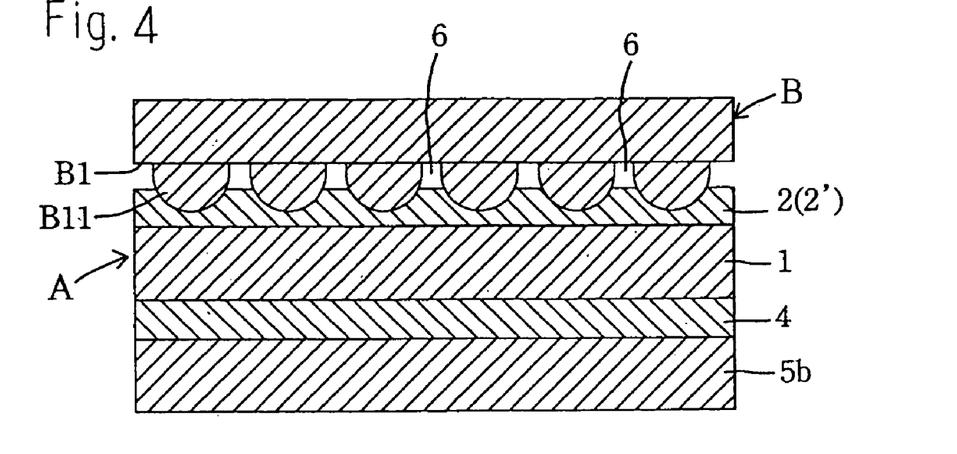
FIG. 4 shows a vertical sectional view showing a state in which a light-diffusing sheet is layered on the curable curable pressure-sensitive adhesive sheet of FIG. 3.

Next, as shown in FIG. 4, the light-diffusing sheet B is layered on the curable pressure-sensitive adhesive layer 2 in a state that the lens surface B1 faces the curable pressure-sensitive adhesive layer 2, and the light-diffusing sheet B is pressed against the curable pressure-sensitive adhesive layer 2 so that the tip of each of the lens elements B11, B11, . . . of the lens surface (surface of concave and convex) B1 of the light-diffusing sheet B is embedded in the curable pressure-sensitive adhesive layer 2.

In the above-mentioned process, as the curable pressure-sensitive adhesive layer 2 is made to have high flatness and smoothness with the surface roughness $R_t$ of 2 μm or less, when the light diffusing sheet B is layered on the curable pressure-sensitive adhesive layer 2, the area of contact between the lens element B11 of the lens surface B1 of the light diffusing sheet B and the curable pressure-sensitive adhesive layer 2 is made to be almost even throughout the whole area, and an even layer of the air 6 can be formed all over between the surfaces of the light diffusing sheet B and the curable pressure-sensitive adhesive layer 2 facing with each other.

In addition, when the light-diffusing sheet B is layered on the curable pressure-sensitive adhesive layer 2, as the curable pressure-sensitive adhesive layer 2 is not completely hardened, degree of embedding of the lens element B11 of the lens surface B1 of the light-diffusing sheet B into the curable pressure-sensitive adhesive layer 2 can be accurately and easily adjusted.

In the meantime, if the degree of embedding of the lens element B11 of the lens surface B1 of the light-diffusing sheet B into the curable pressure-sensitive adhesive layer 2 is shallow, the adhesive force between the two becomes weak and there is a fear that unexpected exfoliation may occur. Accordingly, it is necessary to appropriately adjust the degree of embedding of the lens element B11 of the lens surface B1 of the light-diffusing sheet B into the curable pressure-sensitive adhesive layer 2 so that the effect of the lens of the light-diffusing sheet B and the adhesive force can be compatible with each other.

Then, the curable curable pressure-sensitive adhesive sheet A being layered with the light-diffusing sheet B is left under a condition of a predetermined temperature and for a predetermined period of time so that the curable pressure-sensitive adhesive layer 2 of the curable curable pressure-sensitive adhesive sheet A can be hardened completely to provide a cured pressure-sensitive adhesive layer 2', further in order to provide the first multi-layer sheet D.

As the curable pressure-sensitive adhesive layer 2 is now completely hardened, the cured pressure-sensitive adhesive layer 2' can not easily be transformed by the external force, and the state of adhesion between the light-diffusing sheet and the cured pressure-sensitive adhesive layer 2' is completely fixed.

Accordingly, even if the external force should be applied to the first multi-layer sheet D in the process of layering and integrating the first multi-layer sheet D over and with the polarizer C or the liquid crystal display element F, the state of adhesion between the curable curable pressure-sensitive adhesive sheet A and the hardened pressure-adhesive layer 2' is maintained without fail and excellent optical quality are maintained without changing of the relative position of the curable curable pressure-sensitive adhesive sheet A and the cured pressure-sensitive adhesive layer 2'. Accordingly, the liquid crystal display element F with the use of the first multi-layer sheet D is made to have the excellent optical quality having no irregularity in display performance and the viewing angle dependence being improved.

Furthermore, the release sheet 5b which is separably layered on the pressure-sensitive adhesive layer (adhesive layer) 4 of the substrate 1 of the first multi-layer sheet D is exfoliated to expose the pressure-sensitive adhesive layer (adhesive layer) 4, and then the polarizer C is layered on and integrated with the pressure-sensitive adhesive layer (adhesive layer) 4 to provide the second multi-layer sheet E. In case the pressure-sensitive adhesive layer (adhesive layer) 4 is not mounted on the other surface of the substrate 1 of the curable curable pressure-sensitive adhesive sheet A, the pressure-sensitive adhesive layer (adhesive layer) may be mounted over the polarizer C.

Figure 5:
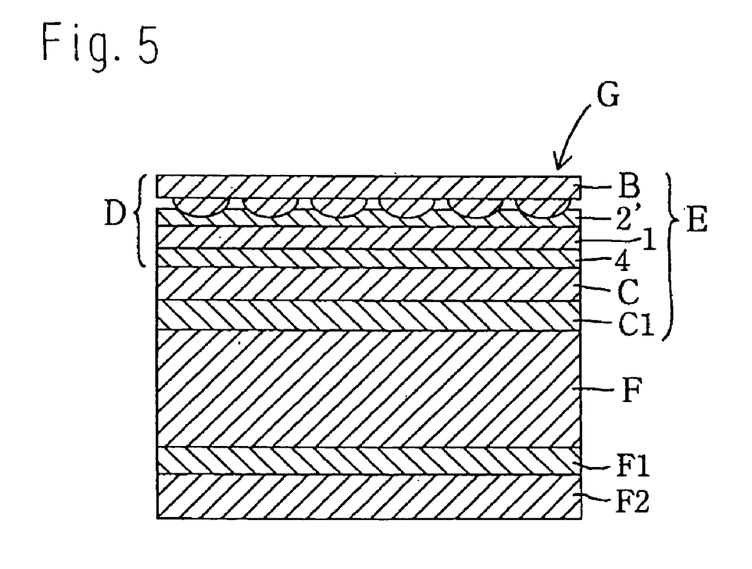
FIG. 5 shows a typical vertical sectional view showing a liquid crystal display device using the curable curable pressure-sensitive adhesive sheet of FIG. 1.

Then, as shown in FIG. 5, an ordinary liquid crystal display element F is layered on and integrated with the polarizer C of the above-mentioned second multi-layer sheet E via a pressure-sensitive adhesive layer or an adhesive layer C1 in a state that the viewing side of the liquid crystal display device faces the polarizer C. Thus, a display device G can be provided. The polarizer C and the liquid crystal display element F may be integrated with each other by other means without mounting the pressure-sensitive adhesive layer or the adhesive layer C1 on the other surface of the polarizer C.

As for the above-mentioned liquid crystal display element F, an ordinary liquid crystal display device is used. For example, such liquid crystal display element F is suggested that comprises an active matrix substrate in which a thin film transistor (TFT) and a transparent pixel electrode and the like are formed in a matrix state on a transparent substrate made of glass or synthetic resin and the like, a substrate in which a color filter and a transparent electrode are formed on the transparent substrate made of glass or synthetic resin and the like, and liquid crystal which is enclosed between the two substrates. In the meantime, a polarizer F2 is layered on and integrated with the opposite surface of the viewing side of the liquid crystal display element F via a pressure-sensitive adhesive layer or an adhesive layer F1.

BRIEF DESCRIPTION OF THE DRAWINGS

The drawings show embodiments of this invention in which.

DETAILED DESCRIPTION OF THE PREFERRED EMBODIMENTS

Embodiments 1~4

As the cationically-polymerizable compounds, bisphenol A-type epoxy resin ① (manufactured by Yuka-Shell Epoxy Co.,Ltd., trade name "EPIKOTE 828", functional group equivalent=190 g-resin/mol), bisphenol A-type epoxy resin ② (manufactured by Yuka-Shell Epoxy Co., Ltd., trade name "EPIKOTE 1001", functional group equivalent=475 g-resin-mol) and alicyclic epoxy resin (manufactured by Daicel Chemical Industries, Ltd., trade name "Celoxide 2081", functional group equivalent=200 g-resin/mol); as the polymer, polyester based resin ① (manufactured by Unitika Ltd., trade name "ELITEL UE3400 "), polyester based resin ② (manufactured by Toyobo Co., Ltd., trade name "VYLON UR3200") and styrene-butadiene-styrene copolymer (manufactured by Asahi Kasei Corporation, trade name "TURPRENE A"); as the photocationic polymerization initiator, aromatic sulfonium salt (manufactured by Asahi Denka Kogyo K.K., trade name "ADEKA Optomer SP170"); and as the tackifier, rosin ester (Arakawa Chemical Industries, Ltd., trade name "PINECRYSTAL KE100") are supplied into a flask by amounts of addition (weight parts) shown in Table 1, and after 100 weight parts of methyl ethyl ketone are supplied into the flask as organic solvent, contents of the flask were agitated and mixed together by using a Homodisper type agitating and mixing machine(Tokushu Kika Kogyo Co., Ltd., trade name "T. K. HOMO DISPER") at an agitating speed of 3000 rpm to provide the curable pressure-sensitive adhesive composite. In Table 1, in parenthesis of a row of the aromatic sulfonium salt, mol percentages of the aromatic sulfonium salt per mol of the epoxy group of the cationically-polymerizable compound are shown.

In the meantime, the polyethylene terephthalate film 5$a$ (manufactured by Lintec Corporation, trade name "PET5001", a surface roughness $R_t$ of a silicone coated surface=0.58 μm), which has a thickness of 50 μm and one side of which has undergone silicone coating treatment, was prepared. Then the silicone coated-surface of the polyethylene terephthalate film 5$a$ was coated with the above-mentioned curable pressure-sensitive adhesive composite with the roll coater so that the thickness of the curable pressure-sensitive adhesive composite after drying can be 10 μm, and was dried with a gear-oven at 110° C. for three minutes in order to provide a transfer sheet.

Then, as the substrate 1 (manufactured by Teijin Ltd., trade name "SCW50", the surface roughness $R_t$ of both surfaces=0.45 μm), the polyethylene terephthalate film, having the thickness of 50 μm and both surfaces thereof being undergone corona-discharge treatment, was prepared. Then onto the surface of the polyethylene terephthalate film, the transfer sheet was adhered by using the laminator in a state that the curable pressure-sensitive adhesive composite was inside, so that the curable pressure-sensitive adhesive layer 2 was transferred to the surface of the substrate 1 to make the curable curable pressure-sensitive adhesive sheet A. In the meantime, the curable curable pressure-sensitive adhesive sheet A was made separately in the same way as described above, and after exfoliating the polyethylene terephthalate film 5$a$ of the curable curable pressure-sensitive adhesive sheet A, the surface roughness $R_t$ of the surface of the curable pressure-sensitive adhesive layer 2 was measured to be 0.76 μm.

In the meantime, the polyethylene terephthalate film 5$b$, which has the thickness of 38 μm and one side of which has undergone silicone coating treatment, was prepared. Then the silicone-treated surface of the polyethylene terephthalate film 5$b$ was coated acryl based pressure-sensitive adhesive (manufactured by Soken Chemical & Engineering Co., Ltd., trade name "SK2006A) with the roll coater so that the thickness of the acryl based pressure-sensitive adhesive after drying can be 25 μm, and was dried with a gear-oven at 110° C. for three minutes.

Then, the above-mentioned polyethylene terephthalate film 5$b$ was adhered onto the other surface of the substrate 1 with the laminator so that the acryl based pressure-sensitive adhesive layer came inside in order to transfer the acryl based pressure-sensitive adhesive layer 4 to the other surface of the substrate 1. (See FIG. 3.)

As the light-diffusing sheet B, the lenticular lens sheet was used. The lenticular lens sheet was made as follows. Namely, at first, ultraviolet-ray-setting resin (manufactured by JSR Corporation, trade name "Z9001", refractive index n=1.59) was dropped on a metal mold in which concaves are successively formed.

Next, after ultraviolet rays were applied to the ultraviolet-ray-setting resin by 1.0 J/cm², the convex was transferred and formed on a Arton film in order to make the lenticular lens sheet. The lenticular lens sheet was formed so that innumerable lens elements of 15 μm high, each of which is furrow-shaped and nearly semicircular in cross section, were successively arranged in parallel with each other at intervals of 50 μm.

Then, in order to prevent surface reflection of the lenticular lens sheet which was made as described above, a gobo layer was formed on the surface of each lenticular lens B1. The gobo layer was made by coating a photosetting type organic material in which black pigment was dispersed over the lens by means of a printing method, and then applying ultraviolet rays by 1.5 J/cm² thereto for setting. At this time, the thickness of the gobo layer was adjusted to be about 5 μm, so that transmittance of the lens sheet of all the rays could be 70%.

Then, the release sheet 5a covering the curable pressure-sensitive adhesive layer 2 of the curable curable pressure-sensitive adhesive sheet A was exfoliated and removed to expose the curable pressure-sensitive adhesive layer 2, to which ultraviolet rays were applied by 1.6 J/cm² by using a metal halide lamp.

Then, the light-diffusing sheet B was layered on the curable pressure-sensitive adhesive layer 2 of the curable curable pressure-sensitive adhesive sheet A with the side of the lens surface B1 facing the curable pressure-sensitive adhesive layer 2, which was supplied between a pair of rollers to be fastened and pressed from both sides in order to embed only the tip of the lens element B11 of the lens surface B1 on the light-diffusing sheet B evenly into the curable pressure-sensitive adhesive layer 2 of the curable curable pressure-sensitive adhesive sheet A by a predetermined depth. In this state, the layer of the air 6 is formed all over and evenly between the surface of the curable pressure-sensitive adhesive layer 2 of the curable curable pressure-sensitive adhesive sheet A and the lens surface B1 of the light-diffusing sheet B, which surfaces are facing with each other.

Next, the curable curable pressure-sensitive adhesive sheet A in which the light-diffusing sheet B is layered on the curable pressure-sensitive adhesive layer 2 was left for 24 hours at 50° C. to completely harden the curable pressure-sensitive adhesive layer 2 in order to provide the cured pressure-sensitive adhesive layer 2'. Further, the first multi-layered sheet D was provided in which the light-diffusing sheet B was layered on and integrated with the cured pressure-sensitive adhesive layer 2' in a state that only the tip of the lens element B11 of the lens surface B1 of the light-diffusing sheet B is embedded in the cured pressure-sensitive adhesive layer 2'. (See FIG. 4.) In this state, the cured pressure-sensitive adhesive layer 2' of the curable curable pressure-sensitive adhesive sheet A was adhered to and integrated with the light-diffusing sheet B, and the state of adhesion was securely held even when a pressure was applied on the light-diffusing sheet B against the curable curable pressure-sensitive adhesive sheet A.

Further, while the release sheet 5b of the first multi-layer sheet D was exfoliated and removed to expose the curable pressure-sensitive adhesive layer 4, an ordinary polarizer C was prepared in which the acryl based curable pressure-sensitive adhesive layer C1 was layered on and integrated with a surface of the polarizer C and the release sheet was separably layered on the curable pressure-sensitive adhesive layer C1. Over the other surface of the polarizer C, the first multi-layer sheet D was layered in a state that the curable pressure-sensitive adhesive layer 4 faced the polarizer C, which was then supplied between the pair of the rollers to be fastened and pressed from both sides so that the polarizer C could be layered on and integrated with the curable pressure-sensitive adhesive layer 4 of the first multi-layer sheet D in order to provide the second multi-layer sheet E.

Then, the release sheet of the polarizer C of the second multi-layer sheet E was exfoliated and removed to expose the curable pressure-sensitive adhesive layer C1, and the second multi-layer sheet E was adhered to the viewing surface of the liquid crystal display element F via the curable pressure-sensitive adhesive layer C1 to provide the liquid crystal display device G.

As the above-mentioned liquid crystal display element F, a conventional and ordinary liquid crystal display device was used.

More specifically, such liquid crystal display device comprises an active matrix substrate in which a thin film transistor (TFT) and a transparent pixel electrode and the like are formed in a matrix state on a transparent substrate made of glass or synthetic resin and the like, a substrate in which a color filter and a transparent electrode are formed on the transparent substrate made of glass or synthetic resin and the like, and liquid crystal which is enclosed between the two substrates. As the liquid crystal, the twisted nematic liquid crystal (TN liquid crystal) with a twist angle of 90° was used, a diagonal size of the screen was 20 inches (height 304.8 mm, width 406.4 mm), R, G and B pixel were arranged in stripes being horizontal number of pixel 640 (R, G, B)×vertical number of pixel 480, and pixel pitch was 0.212 mm in horizontal direction Ph and 0.635 mm in vertical direction Pv. In the meantime, the polarizer F2 was layered on and integrated with the liquid crystal display element F on the opposite surface of the viewing side via the pressure-sensitive adhesive layer or the adhesive layer F1.

In an arrangement above, the second multi-layer sheet E was arranged in a state that each of the lenticular lens element B11 of the light-diffusing sheet B was arrayed in the horizontal direction of the screen of the liquid crystal display element F.

COMPARATIVE EXAMPLE 1

95 weight parts of 2-ethylhexylacrylate, 5 weight parts of acrylic acid, and 0.05 weight parts of azobisisobutylonitrile were polymerized in 100 weight parts of ethyl acetate under reflux. Such reflux forms polymer solution. After the polymerization the polymer solution was diluted by ethylacetate to the extent of solid concentration of 20 weight %, and then 0.02 weight parts of N,N,N',N'-tetraglycidyl-m-xylenediamine was loaded as a crosslinking agent per 100 weight parts of the polymer solution made as aforementioned in order to provide the pressure-sensitive adhesive composite.

The curable curable pressure-sensitive adhesive sheet, the first multi-layer sheet, the second multi-layer sheet and the liquid crystal display device were made in a way similar to those of the embodiment 1 except that the pressure-sensitive adhesive composite was used instead of the curable pressure-sensitive adhesive composite.

The storage modulus by dynamic viscoelasticity spectrum at 23° C. before and after hardening (or after crosslinking) of the curable pressure-sensitive adhesive composite (or the pressure-sensitive adhesive composite), peel strength after hardening (or after crosslinking), and the display characteristics and display uniformity (irregularity in display performance) were measured in the below-mentioned methods, results of which are shown in Table 1.

(Storage Modulus)

The curable pressure-sensitive adhesive layer 2 before hardening was exfoliated from the polyethylene terephthalate film 5a of the transfer sheet, and the storage modulus by dynamic viscoelasticity spectrum at 23° C. of the curable pressure-sensitive adhesive composite comprising the curable pressure-sensitive adhesive layer 2 was measured by a shear method at a frequency of 10 Hz by using a dynamic viscoelasticity spectrum storage modulus tester (manufactured by Iwamoto Corp., trade name "VES-III").

Further, the ultraviolet rays with a center wavelength of 365 nm were applied to the curable pressure-sensitive adhesive layer 2 of the transfer sheet by 1.6 J/cm$^2$ by using the metal halide lamp (manufactured by Orc Manufacturing Co., Ltd., trade name "Handy 800"), and thereafter the curable pressure-sensitive adhesive layer 2 was left for 24 hours at 50° C. to harden the curable pressure-sensitive adhesive composite comprising the curable pressure-sensitive adhesive layer 2 for providing the cured pressure-sensitive adhesive layer 2'. Then the cured pressure-sensitive adhesive layer 2' was exfoliated from the polyethylene terephthalate film 5a and the storage modulus by dynamic viscoelasticity spectrum at 23° C. of the cured pressure-sensitive adhesive layer 2' was measured similarly. As regards to the example for comparison 1, curing was done for 3 days at 23° C. and measurement was done in the similar way as the storage modulus after crosslinking.

(Peel Strength)

The provided curable curable pressure-sensitive adhesive sheet A was cut into pieces of flat rectangle of 1 cm wide×5 cm long, and was left for 1 minute after applying the ultraviolet rays with a center wavelength of 365 nm to the curable pressure-sensitive adhesive layer 2 of the curable curable pressure-sensitive adhesive sheet by 1.6 J/cm$^2$ by using the metal halide lamp (manufactured by Orc Manufacturing Co., Ltd., trade name "Handy 800").

Then, after the polyethylene terephthalate film 5a was exfoliated, the curable curable pressure-sensitive adhesive sheet was laminated with a separately provided rigid PVC plate under conditions of a temperature of 23° C., a linear load of 20N/cm and a laminating speed of 1 m/minute by using a laminator, and was left for 3 days under an atmosphere of 50° C.

Next, by using a tension tester (manufactured by Toyo Seiki Seisaku-sho, Ltd., trade name "Strograph"), peel strength at 180° angle (N/cm) was measured at a parameter of tension speed of 50 mm/minute, which is designated as adhesive strength.

In the meantime, in the embodiments 1 and 2, the polyethylene terephthalate film was ruptured, in the embodiments 3 and 4, the polyethylene terephthalate film and the cured pressure-sensitive adhesive layer were exfoliated from each other at an interface, and in the example for comparison 1, the pressure-sensitive adhesive layer and the rigid PVC plate were exfoliated from each other at the interface.

(Display Characteristics)

Voltage was impressed on the liquid crystal display device to show black and white, and luminance was measured by changing angles in the direction of widened viewing angle, namely, in vertical direction (up and down) of the screen by using a luminance measuring instrument (manufactured by ELDIM Corp., trade name "EZ Contrast"). In the meantime, a standard was set up at the luminance at the time of showing white and in front direction, and as a lighting device a general backlight used in a liquid crystal display was used. In addition, a contrast characteristic was found by dividing the luminance at the time of showing white by the luminance at the time of showing black.

○ . . . All of the following conditions ①~③ are met.
  ① The luminance change is less than 20% to the front luminance within a range of 80° or more in vertical direction (total angle in up and down).
  ② Contrast ratio is 100 or more within a range of 80° or more in vertical direction (total angle in up and down).
  ③ Front contrast ratio is 200 or more.

Δ . . . All of the following conditions ①~③ are met.
  ① The luminance change is less than 20% to the front luminance within a range of 70° or more in vertical direction (total angle in up and down).
  ② Contrast ratio is 100 or more within a range of 70° or more in vertical direction (total angle in up and down).
  ③ Front contrast ratio is 150 or more.

X . . . Falling under neither ○ n or Δ

(Display Uniformity)

The liquid crystal display device was placed on a level surface to which a fluorescent light of 1000 luxes was applied from the direction being 20° deviated from a normal direction to the liquid crystal display surface of the liquid crystal display device. Then the liquid crystal display surface was viewed by naked eyes from a direction of light reflection and within the range of 20~70° from the direction of the normal direction to the liquid display surface. ○ indicates that there is no irregularity in display performance, Δ indicates that slight irregularity in display performance is observed and X indicates that irregularity in display performance is clearly observed.

(Cont./to next page)

TABLE 1

|  |  | Embodiments | | | | Comparative Example |
|---|---|---|---|---|---|---|
|  |  | 1 | 2 | 3 | 4 | 1 |
| Curable pressure-sensitive adhesive composite (weight parts) | Bisphenol A-type epoxy resin ① | 20 | — | — | 50 | — |
|  | Bisphenol A-type epoxy resin ② | 10 | — | — | — | — |
|  | Alicyclic epoxy resin | — | 40 | 15 | — | — |
|  | Polyester based resin ① | 70 | — | — | — | — |
|  | Polyester based resin ② | — | 60 | 85 | — | — |
|  | Styrene-butadiene-styrene copolymer | — | — | — | 50 | — |
|  | Aromatic sulfonium salt | 1 (0.62) | 1 (0.39) | 1 (1.04) | 1 (0.30) | — |
|  | Rosin ester resin | — | — | — | 30 | — |

TABLE 1-continued

| | | | Embodiments | | | | Comparative Example |
|---|---|---|---|---|---|---|---|
| | | | 1 | 2 | 3 | 4 | 1 |
| Measurement results | Storage modulus (Pa) | Before hardening | $6.2 \times 10^5$ | $7.8 \times 10^5$ | $4.2 \times 10^6$ | $6.0 \times 10^5$ | $1.1 \times 10^6$ |
| | | After hardening | $9.5 \times 10^6$ | $6.6 \times 10^7$ | $8.1 \times 10^8$ | $3.1 \times 10^6$ | (After crosslinking) |
| | Peel Strength (N/cm) | | >20 | >20 | 12 | 8 | 7 |
| | Display characteristics | | ○ | ○ | Δ | ○ | Δ |
| | Display uniformity (irregularity in display performance) | | ○ | ○ | ○ | Δ | X |

Figure 6:
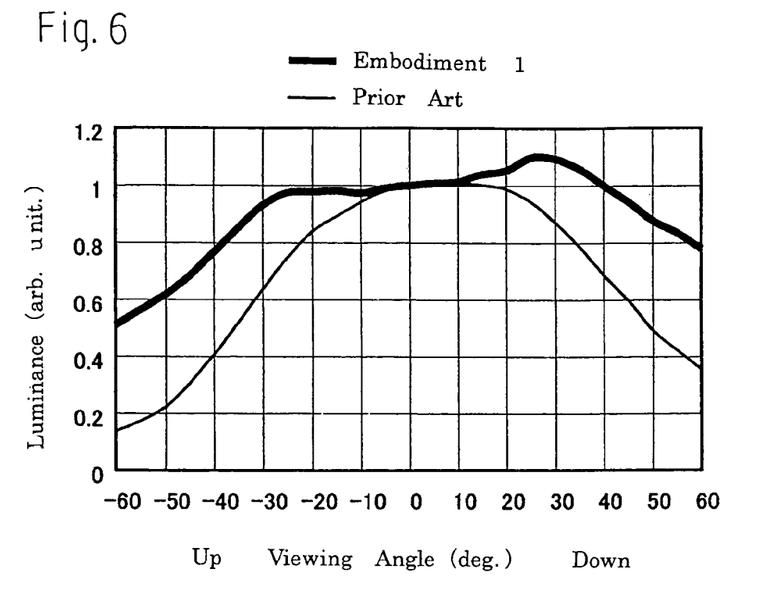
FIG. 6 shows a graph showing luminance characteristics in vertical (up and down) direction of the screen of the liquid crystal display device.
Figure 7:
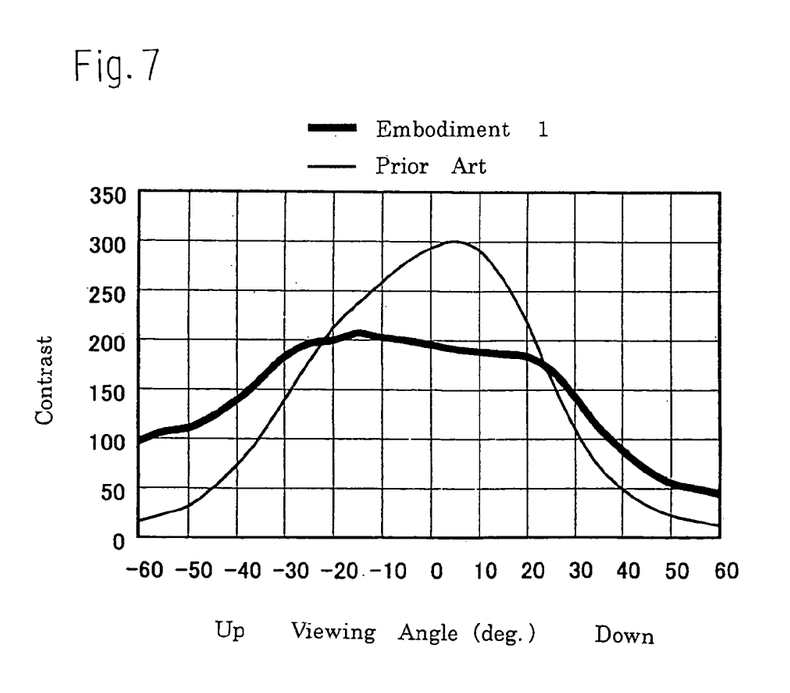
FIG. 7 shows a graph showing contrast characteristics in vertical (up and down) direction of the screen of the liquid crystal display device.

Further, luminance characteristics and contrast characteristics of the liquid crystal display device made in the embodiment 1 were measured, the results of which are shown in FIGS. 6 and 7.

In the meantime, FIG. 6 shows the viewing angle dependence of the luminance of the liquid crystal display device in the vertical (up and down) direction of the screen, namely the direction in which the viewing angle was widened in the embodiment 1. FIG. 7 shows the viewing angle dependence of the contrast of the liquid crystal display device in the vertical (up and down) direction of the screen. In FIGS. 6 and 7, thick solid lines show the characteristics of the liquid crystal display device of the embodiment 1, and thin solid lines show the characteristics of the conventional TN liquid crystal display device, namely, the liquid crystal display device in which the light-diffusing sheet is not mounted.

As shown in FIGS. 6 and 7, in the liquid crystal display device of the embodiment 1, variation of luminance and contrast according to viewing angles is smaller, changes in visible images in the vertical (up and down) direction of the screen is smaller, and the viewing angle dependence has been substantially improved compared to the conventional liquid crystal display device.

(Advantages of the Invention)

The curable pressure-sensitive adhesive sheet according to this invention comprises the optically transparent substrate on which the curable pressure-sensitive adhesive layer is layered and integrated therewith. The curable pressure-sensitive adhesive layer comprises the curable pressure-sensitive adhesive composite comprising the cationically-polymerizable compound, the polymer, and the photocationic polymerization initiator. Further, the curable pressure-sensitive adhesive sheet comprises the surface roughness $R_t$ of the surface of the curable pressure-sensitive adhesive layer being 2 μm or less. Consequently, the curable pressure-sensitive adhesive layer has excellent flexibility before hardening and therefore the light-diffusing sheet can be layered on the curable pressure-sensitive adhesive layer in the state that each of the lens elements of the lens surface of the light-diffusing sheet can be embedded accurately to the required depth into the curable pressure-sensitive adhesive layer. Consequently, by using the curable pressure-sensitive adhesive sheet, the light-diffusing sheet can be layered on the curable pressure-sensitive adhesive layer without fail while the optical quality of the light-diffusing sheet is effectively utilized, and the liquid crystal display device in which the viewing angle dependence is improved can be provided without fail.

In addition, the curable pressure-sensitive adhesive layer presents the excellent adhesive force and elastic modulus after hardening so that the state of the adhesion with the light-diffusing sheet layered thereon before hardening can be securely maintained. Therefore, in an assembly process of the liquid crystal display device thereafter, even when the multi-layer sheet is layered on a surface which is not flat, the relative position of the curable pressure-sensitive adhesive sheet and the light-diffusing sheet does not change unexpectedly, and the optical quality of the obtained liquid crystal display device does not disperse on the screen.

Further, the smoothness of the curable pressure-sensitive adhesive layer is so excellent that the surface roughness $R_t$ is 2 μm or less. Accordingly, when the light-diffusing sheet is layered on the curable pressure-sensitive adhesive layer, the area of contact between each of the lens elements of lens surface of the light-diffusing sheet and the curable pressure-sensitive adhesive layer can be made to be almost even all over by embedding the each of the lens elements of the lens surface of the light-diffusing sheet into the curable pressure-sensitive adhesive layer to the predetermined depth with accuracy. Further, the layer of the air can be formed evenly all over between the facing surfaces of the light-diffusing sheet and the cured pressure-sensitive adhesive layer which can be provided by hardening the curable pressure-sensitive adhesive layer. Therefore, in the liquid crystal display device using the curable pressure-sensitive adhesive sheet, irregularity in display performance, caused by uneven layer of the air formed between the facing surfaces of the light-diffusing sheet and the cured pressure-sensitive adhesive layer, does not occur.

Further, in the curable pressure-sensitive adhesive sheet, in case the surface roughness $R_t$ of the surface of the substrate, on which the curable pressure-sensitive adhesive layer is layered, is 2 μm or less, the curable pressure-sensitive adhesive layer with the surface roughness $R_t$ of 2 μm or less can be easily and surely provided, and the curable pressure-sensitive adhesive sheet having the excellent effects as above-mentioned can be easily and surely provided.

Furthermore, in the curable pressure-sensitive adhesive sheet, the lens element of the lens surface of the light-diffusing sheet can be embedded into the curable pressure-sensitive adhesive layer while being adjusted delicately and accurately so that the optical quality of the light-diffusing sheet can be demonstrated effectively, in case the curable pressure-sensitive adhesive layer comprises the curable pressure-sensitive adhesive composite, whose storage modulus at 23° C. by dynamic viscoelasticity spectrum before hardening is $9.0 \times 10^5$ Pa or less or preferably $1.0 \times 10^4 \sim 9.0 \times 10^5$ Pa, and whose storage modulus at 23° C. by dynamic viscoelasticity spectrum after hardening is $4.0 \times 10^6$ Pa or more or preferably $4.0 \times 10^6 \sim 1.0 \times 10^{10}$ Pa. Accordingly, by using the curable pressure-sensitive adhesive sheet, the liquid crystal display device can be provided in which the optical quality of the light-diffusing sheet is more effectively utilized, no irregularity in display performance is found and the viewing angle dependence is improved.

In addition, the first multi-layer sheet comprising the light-diffusing sheet which is layered on and integrated with the cured pressure-sensitive adhesive layer, being made by hardening the curable pressure-sensitive adhesive layer of the curable pressure-sensitive adhesive sheet, in a state that the lens surface of the light-diffusing sheet faces the cured pressure-sensitive adhesive layer, and the second multi-layer sheet consists of the polarizer being layered on and integrated with the other surface of the substrate of the first multi-layer sheet via the pressure-sensitive adhesive layer or the adhesive layer. Therefore, in the liquid crystal display device using the first multi-layer sheet or the second multi-layer sheet, neither irregularity in display performance nor unevenness or dispersion of the optical quality on the screen occurs, as mentioned above.

The invention claimed is:

1. A multi-layer sheet comprising;
   an optically transparent substrate,
   a cured pressure-sensitive adhesive layer formed by hardening a curable pressure-sensitive layer of a curable pressure-sensitive adhesive sheet in which the curable pressure-sensitive adhesive layer is layered on and integrated with a surface of the optically transparent substrate, and
   a light-diffusing sheet having a lens surface; a part of a lens element of the lens surface being embedded in a surface of the cured pressure-sensitive adhesive layer, and
   a layer of air between the lens surface of the light diffusing sheet and said surface of the cured pressure-sensitive adhesive layer,
   wherein the curable pressure-sensitive adhesive layer comprises a curable pressure-sensitive adhesive composite having a cationically-polymerizable compound, a polymer, and a photocationic polymerization initiator, the said curable pressure-sensitive adhesive layer has a surface roughness $R_t$ of 2 μm or less, and a surface of the substrate on which the curable pressure-sensitive adhesive layer is layered, has a surface roughness $R_t$ of 2 μm or less, and
   further wherein the curable pressure-sensitive adhesive layer has a storage modulus of $9.0 \times 10^5$ Pa or less, by dynamic viscoelasticity spectrum at 23° C., before hardening, and has a storage modulus of $4.0 \times 10^6$ Pa or more, by dynamic viscoelasticity spectrum at 23° C., after hardening.

2. The multi-layer sheet as claimed in claim 1, wherein the curable pressure-sensitive adhesive layer has a storage modulus of $1.0 \times 10^4 \sim 9.0 \times 10^5$ Pa, by dynamic viscoelasticity spectrum at 23° C., before hardening, and has a storage modulus of $4.0 \times 10^6 \sim 1.0 \times 10^{10}$ Pa, by dynamic viscoelasticity spectrum at 23° C., after hardening.

3. The multilayer sheet as claimed in claim 1, further comprising a polarizer layered on and integrated with another surface of the substrate in the multi-layer sheet via a pressure-sensitive adhesive layer or an adhesive layer.

4. A liquid crystal display device comprising;
   a multi-layer sheet including an optically transparent substrate, a cured pressure-sensitive adhesive layer formed by hardening a curable pressure-sensitive layer of a curable pressure-sensitive adhesive sheet in which the curable pressure-sensitive adhesive layer is layered on and integrated with a surface of the optically transparent substrate,
   a light-diffusing sheet having a lens surface; a part of a lens element of the lens surface being embedded in a surface of the cured pressure-sensitive adhesive layer,
   a layer of air between the lens surface of the light diffusing sheet and said surface of the cured pressure-sensitive adhesive layer;
   a polarizer layered on and integrated with another surface of the optically transparent substrate in the multi-layer sheet via a pressure-sensitive adhesive layer or an adhesive layer, and
   a liquid crystal display element; said display element being layered on and integrated with the multi-layer sheet via the polarizer,
   wherein the curable pressure-sensitive adhesive layer comprises a curable pressure-sensitive adhesive composite having a cationically-polymerizable compound, a polymer, and a photocationic polymerization initiator and the said curable pressure-sensitive adhesive layer has a surface roughness $R_t$ of 2 μm or less, and
   further wherein the curable pressure-sensitive adhesive layer has a storage modulus of $9.0 \times 10^5$ Pa or less, by dynamic viscoelasticity spectrum at 23° C., before hardening, and has a storage modulus of $4.0 \times 10^6$ Pa or more, by dynamic viscoelasticity spectrum at 23° C., after hardening.

* * * * *